United States Patent
Yanagibashi et al.

(10) Patent No.: US 9,458,736 B2
(45) Date of Patent: Oct. 4, 2016

(54) WIND TURBINE GENERATOR SYSTEM

(75) Inventors: Takuji Yanagibashi, Tokyo (JP);
Takashi Matsunobu, Tokyo (JP);
Tsutomu Hasegawa, Tokyo (JP);
Kiyoshi Sakamoto, Tokyo (JP);
Kenichi Azegami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 595 days.

(21) Appl. No.: 13/983,208

(22) PCT Filed: Feb. 4, 2011

(86) PCT No.: PCT/JP2011/052327
§ 371 (c)(1),
(2), (4) Date: Aug. 1, 2013

(87) PCT Pub. No.: WO2012/105032
PCT Pub. Date: Aug. 9, 2012

(65) Prior Publication Data
US 2013/0309093 A1 Nov. 21, 2013

(51) Int. Cl.
*F03D 11/00* (2006.01)
*F01D 25/12* (2006.01)

(52) U.S. Cl.
CPC ............ *F01D 25/12* (2013.01); *F03D 13/20* (2016.05); *F05B 2260/20* (2013.01); *F05B 2260/232* (2013.01); *Y02E 10/728* (2013.01)

(58) Field of Classification Search
CPC .............. F01D 25/12; F05B 2240/912; F05B 2260/205; F05B 2260/226; F05B 2260/232; F05B 2260/20; Y02E 10/727
See application file for complete search history.

(56) References Cited

U.S. PATENT DOCUMENTS

| 6,520,737 | B1 * | 2/2003 | Fischer | F03D 11/00 415/175 |
| 6,676,122 | B1 | 1/2004 | Wobben | |
| 7,111,668 | B2 * | 9/2006 | Rurup | F03D 11/00 165/134.1 |

(Continued)

FOREIGN PATENT DOCUMENTS

| JP | 64-77444 A | 3/1989 |
| JP | 10-20081 A | 1/1998 |

(Continued)

OTHER PUBLICATIONS

International Search Report dated Mar. 1, 2011 w/ partial English translation (three (3) pages).
Japanese Office Action dated Jan. 7, 2014 (two (2) pages).

*Primary Examiner* — Ninh H Nguyen
(74) *Attorney, Agent, or Firm* — Crowell & Moring LLP (57) ABSTRACT

According to the present invention, a wind turbine generator system is provided which can not only remove the influence of salt damage in case the system is established off-shore, but even if the facility becomes larger, which can also cool equipment and the generator provided in the tower and can reduce the possibility of decreasing power generation efficiency. The wind turbine generator system of the present invention comprising a rotor having a hub and blades; a generator connected with the rotor by way of a main shaft connected with the hub; a nacelle which contains at least the generator and supports the rotor pivotally by way of the main shaft; a tower on a top of which the nacelle is supported, and opposite to the top the tower is fixed to a base, wherein a heat exchanger is provided at the tower close to the base and cooling medium passes through the heat exchanger by way of a pipe arrangement, and thereby the heat of the cooling medium and the heat of air inside the tower are exchanged and the air inside the tower is cooled.

17 Claims, 7 Drawing Sheets

(56) References Cited

U.S. PATENT DOCUMENTS

| | | | |
|---|---|---|---|
| 7,905,104 B2* | 3/2011 | Matesanz Gil | F03D 11/00 62/259.1 |
| 2008/0164966 A1 | 7/2008 | Findeisen | |
| 2010/0061853 A1* | 3/2010 | Bagepalli | F03D 11/00 416/95 |

FOREIGN PATENT DOCUMENTS

| | | |
|---|---|---|
| JP | 2003-504562 A | 2/2003 |
| JP | 2009-138555 A | 6/2009 |
| WO | WO 01/77526 A1 | 10/2001 |
| WO | WO 2010/015651 A1 | 2/2010 |
| WO | WO 2010/069954 A1 | 6/2010 |

* cited by examiner

WIND TURBINE GENERATOR SYSTEM

TECHNICAL FIELD

The present invention relates to a wind turbine generator system, and particularly to a wind turbine generator system suitable for being established off-shore.

BACKGROUND ART

The effective use of renewable energy has recently taken place. Wind turbine generator systems have been developed around the world as an especially profitable project. At present, wind power generating facilities which have been constructed are mainly established at coasts on-shore.

But, wind as driving force of the wind power generator is generally stronger on the sea comparing to on land which has more disturbances, and the wind direction off-shore is more stabilized. So, because not only more output can be obtained off-shore but also it doesn't cause noise pollution, establishing the wind turbine generator systems not on-shore but off-shore is preferable.

Usually, the wind turbine generator system has a nacelle supporting the rotor which is rotated by blades. In the nacelle, a generator and other things are contained. The generator is rotated by a rotation of a main shaft connected with the blades. The nacelle is configured to be supported by the tower. The generator contained in the nacelle generates a large amount of thermal energy, and additionally in case the wind turbine generator systems are established off-shore, some consideration is necessary for not being affected by salt damage from sea water.

Considering these problems, namely, both cooling the generator contained inside the nacelle and removing influence of the salt damage from sea water, the patent literature 1 has been proposed.

In patent literature 1, wind turbine generator systems established off-shore are described, they have a circulation line which circulates sea water in the tower and in the nacelle, and a compressor which provides the sea water in the nacelle. In one of the wind turbine generator systems, after the sea water is circulated in the nacelle, the sea water is discharged either from the bottom of the tower or from the nacelle. In the other of the wind turbine generator systems, the circulation line is a closed system, and after cooling water is circulated in the nacelle, the cooling water is cooled by exchanging the heat with sea water at the bottom of the tower. Because of said features, the heat generated by the generator is cooled by exchanging the heat inside the wind turbine generator system while sealing inside and outside the wind turbine generator system so that the influence of the salt content in the sea water could be removed.

CITATION LIST

Patent Literature

Patent Literature 1: JP-A-2009-138555

SUMMARY OF INVENTION

Technical Problem

However, in patent literature 1, the compressor is used for providing sea water from the bottom of the tower to the nacelle upwardly, as for a large-sized wind turbine generator system, height from the bottom of the tower to the nacelle exceeds 50 m, so power for moving the compressor becomes large. Therefore, there are some possibilities that some loss will generate, and cooling of the generator cannot be performed well, and the power generation efficiency may be decreased.

This invention is done regarding of those problems, and the purpose is, to provide the wind turbine generator system which can not only remove the influence of the salt damage in case the system is established off-shore, but which can also cool equipment and the generator provided in the tower and can reduce the possibility of decreasing power generation efficiency even if the system becomes large.

Solution to Problem

To achieve the above purpose, the wind turbine generator system of the present invention comprises a rotor having a hub and blades; a generator connected with the rotor by way of a main shaft connected with the hub; a nacelle which contains at least the generator and supports the rotor pivotally by way of the main shaft; a tower on a top of which the nacelle is supported, and opposite to the top the tower is fixed to a base; wherein a heat exchanger is provided at the tower close to the base and cooling medium passes through the heat exchanger by way of a pipe arrangement, and thereby the heat of the cooling medium and the heat of air inside the tower are exchanged and the air inside the tower is cooled, or wherein the wind turbine generator system is provided off-shore, wherein heat exchangers are provided at the tower close to the base and in the sea, respectively, wherein between the two heat exchangers, a first cooling medium circulation line in which cooling medium is circulated is provided, and the cooling medium is circulated between both of the heat exchangers through a pipe arrangement, wherein the cooling medium is cooled by exchanging the heat with sea water, in the heat exchanger provided in the sea passing through the first cooling medium circulation line, and the cooling medium is introduced into the heat exchanger provided inside the tower, and wherein the heat of the cooling medium and the heat of the air inside the tower are exchanged in the heat exchanger provided inside the tower, and the air inside the tower is cooled.

Advantageous Effects of Invention

According to the present invention, it becomes possible to provide a wind turbine generator system which can not only remove the influence of the salt damage in case the system is established off-shore, but which can also cool the equipment and the generator provided in the tower and which can reduce the possibility of decreasing power generation efficiency even if the system becomes large.

DESCRIPTION OF EMBODIMENT

Below, the wind turbine generator system of the present invention is explained based on the embodiments shown in the figures.

Embodiment 1

Figure 1:
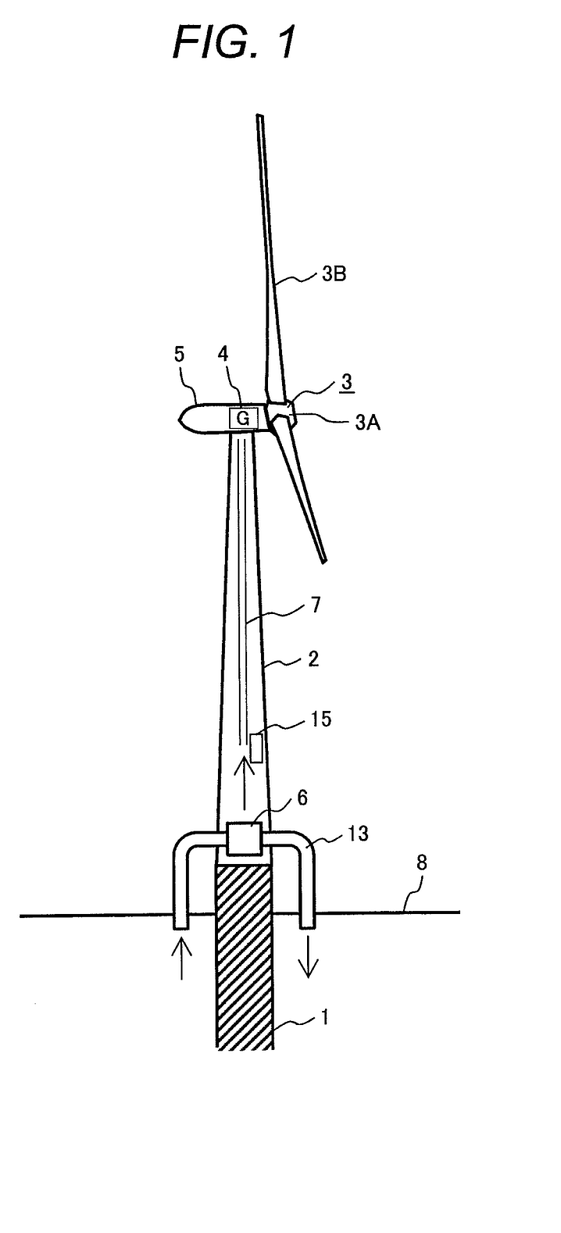
FIG. 1 is showing an overall structure of embodiment 1 of the wind turbine generator system of the present invention
Figure 2:
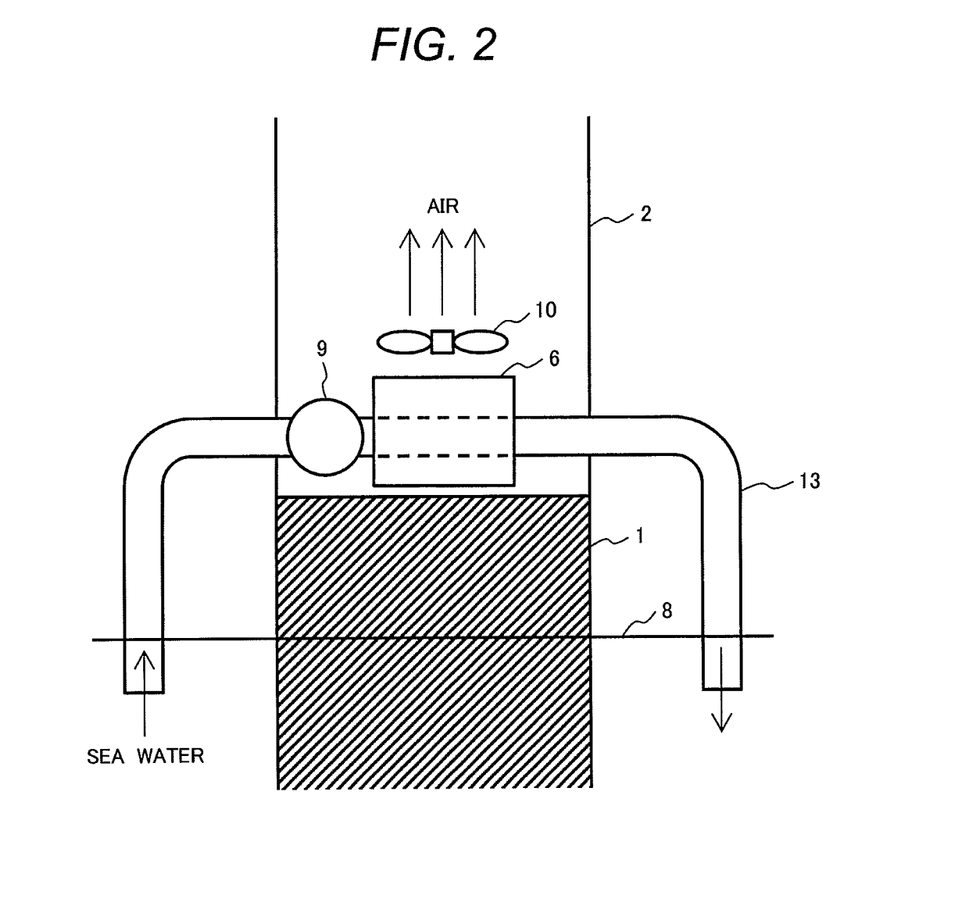
FIG. 2 is showing a partial cross sectional view near the bottom of the tower in FIG. 1

In FIGS. 1 and 2, the embodiment 1 of the wind turbine generator system of the present invention is shown. As shown in FIG. 1, the wind turbine generator system of this embodiment roughly comprises a rotor 3 having a hub 3A and blades 3B, a generator 4 connected with this rotor 3 byway of a main shaft (not shown) and a speed-up gear (not shown), a nacelle 5 which contains the generator 4 and other equipment and supports the rotor 3 by way of the main shaft, and a tower 2 on a top of which the nacelle 5 is supported and opposite to the top the tower is fixed to a base 1. The wind turbine generator system is established off-shore.

Then, in this embodiment, as the detail structure is shown in FIG. 2, a heat exchanger 6 is provided at a bottom part inside the tower 2 (as for this invention, half height or lower of the tower 2 is defined as bottom part of the tower) which is fixed to a part of the base 1, which is fixed to the sea-bottom, protuberated from sea water 8. This heat exchanger 6 is provided with a pipe arrangement 13 which introduces the sea water 8 into the heat exchanger and discharges the sea water exchanged the heat with the air inside the tower 2 into the sea. Additionally, in a middle part of the pipe arrangement 13 inside the tower, a pump 9 to pump up the sea water 8 from sea is provided. The sea water 8 passing through the heat exchanger 6 is circulated by the pump 9 by way of the pipe arrangement 13.

Besides, inside the tower 2, a duct 7 which introduces the cooled air inside the tower 2 to the nacelle 5 is provided (refer to FIG. 1), and the cooled air inside the tower is introduced to the duct 7 by a fan 10 set above the heat exchanger 6.

Next, the way to cool (to exchange heat) the air inside the tower in this embodiment will be explained.

In this embodiment, the sea water 8 pumped up from the sea by the pump 9 by way of the pipe arrangement 13 is passing through the heat exchanger 6, and discharged. On this occasion, the heat of the sea water 8 and the heat of the air inside the tower 2 are exchanged in the heat exchanger 6, and the air inside the tower 2 is cooled.

Using the cooled air inside the tower 2, equipment (a control panel, an electrical device, a transformer, and so on) 15 provided inside the tower can be cooled and the generator 4 inside the nacelle 5 can also be cooled by introducing the air to the top of the tower 2 by way of the duct 7. Besides, using the fan 10, by flowing the cooled air inside the tower 2 to the duct 7 compulsorily, the cooling efficiency is further improved.

According to this embodiment, even if the wind turbine generator facility is provided off-shore, because the inside of the facility is sealed from the outside, air containing salt does not enter the facility and the facility is not affected by the salt damage. Besides, even if the facility is large, or if the height from the bottom of the tower to the nacelle exceeds 50 m, cooling the generator can be performed well, and the wind turbine generator facility which can reduce the possibility of decreasing power generation efficiency is provided.

Embodiment 2

Figure 3:
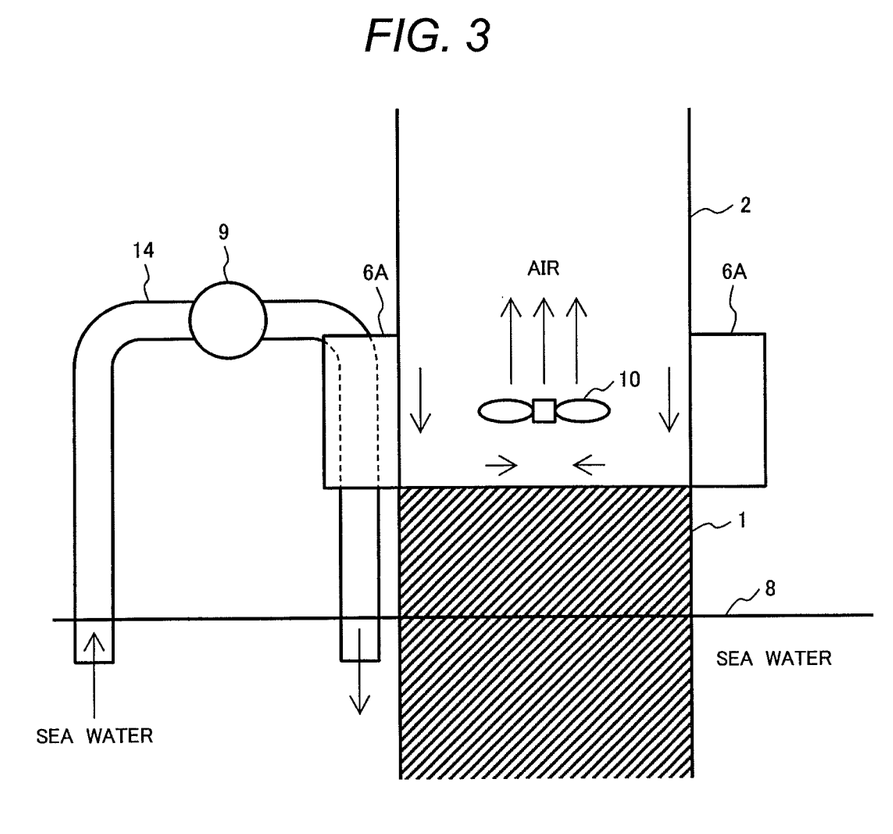
FIG. 3 is showing the embodiment 2 of the present invention and a partial cross sectional view near the bottom of the tower corresponding to FIG. 2

In FIG. 3, the embodiment 2 of the wind turbine generator system of the present invention is shown. About the same structure as in embodiment 1, the same reference signs are used, so that an explanation of them will be omitted.

The embodiment 2 shown in FIG. 3 differs from embodiment 1 that in the heat exchanger 6A which is provided not inside the tower 2 but on a side wall in the outside and bottom part of the tower 2.

The heat exchanger 6A is provided with a pipe arrangement 14 which introduces the sea water 8 into the heat exchanger and discharges the sea water 8 exchanged the heat with the air inside the tower 2 by way of the side wall of the tower 2 into the sea. Further, in a middle part of the pipe arrangement 14, the pump 9 to pump up the sea water 8 from the sea is provided. The seawater 8 is passing through the heat exchanger 6A, which is provided on the side wall of the outside and bottom part of the tower 2, and is circulated by the pump 9 by way of the pipe arrangement 14. The other structure is the same as in the embodiment.

In the embodiment 2, not only the same effect as in embodiment 1 can be obtained, but the sea water also does not enter the tower 2 and so the possibility that corrosion of the equipment contained in the tower 2 occurs can be completely reduced.

Incidentally, in this embodiment, even if tower 2 and the heat exchanger 6A are integrated, the same effect can be obtained. For instance, splashing sea water directly to the outside wall of the tower 2 or using a part of the tower as heat exchanger may be possible.

Embodiment 3

Figure 4:
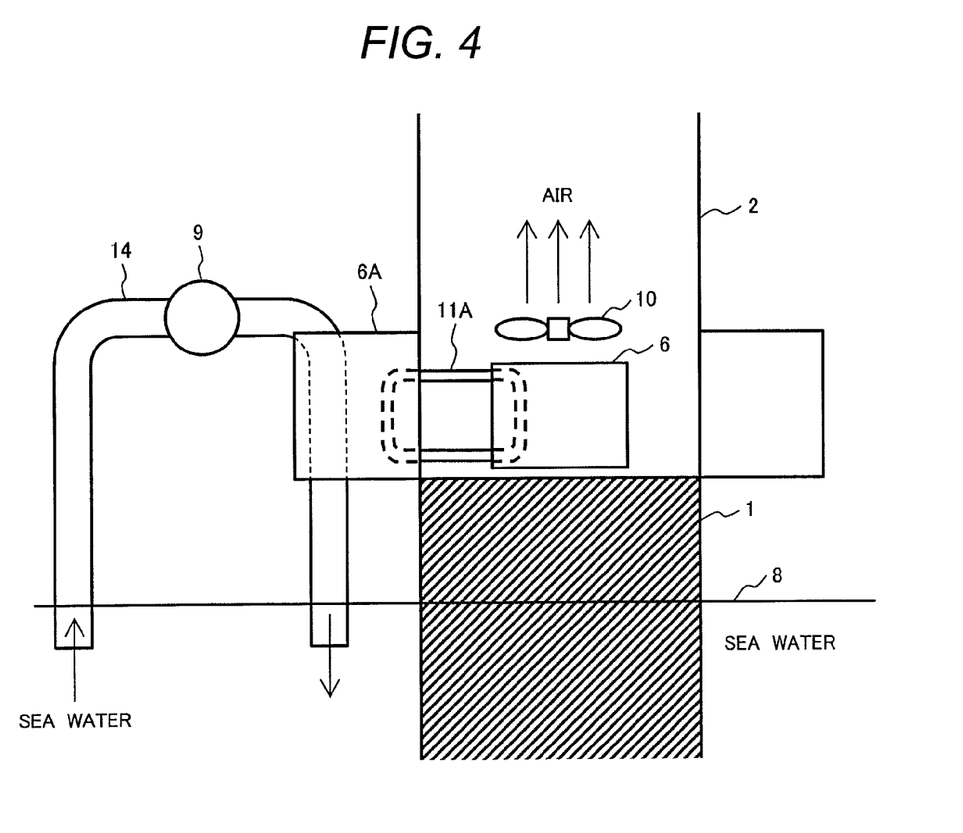
FIG. 4 is showing the embodiment 3 of the present invention and a partial cross sectional view near the bottom of the tower corresponding to FIG. 2

In FIG. 4, the embodiment 3 of the wind turbine generator system of the present invention is shown. About the same structure as in embodiment 2, the same reference signs are used, so that an explanation of them will be omitted.

The embodiment 3 shown in FIG. 4 is the alternative of the embodiment 2. The embodiment 3 shown in the figure has the same structure as the embodiment 2 and differs from the embodiment 2 that the heat exchanger 6 is also provided at a bottom part inside the tower 2. Further, the embodiment 3 differs from the embodiment 2 that a cooling medium circulation line 11A is provided between the heat exchanger 6 at a bottom part inside the tower 2 and the heat exchanger 6A on a side wall of the outside and bottom part of the tower 2 and in the cooling medium circulation line 11A cooling medium (for instance, fresh water) is circulated, and the cooling medium is circulated in both the heat exchanger 6 and the heat exchanger 6A through a pipe arrangement.

In the embodiment 3, the sea water 8 and cooling medium in the cooling medium circulation line 11A exchanges the heat in the heat exchanger 6A, and the cooling medium is cooled. This cooling medium is introduced in the heat exchanger 6 by way of the cooling medium circulation line 11A, and exchanges the heat in the heat exchanger 6 with the air inside the tower 2. Therefore, the same effect as in embodiment 2 can be obtained.

Embodiment 4

Figure 5:
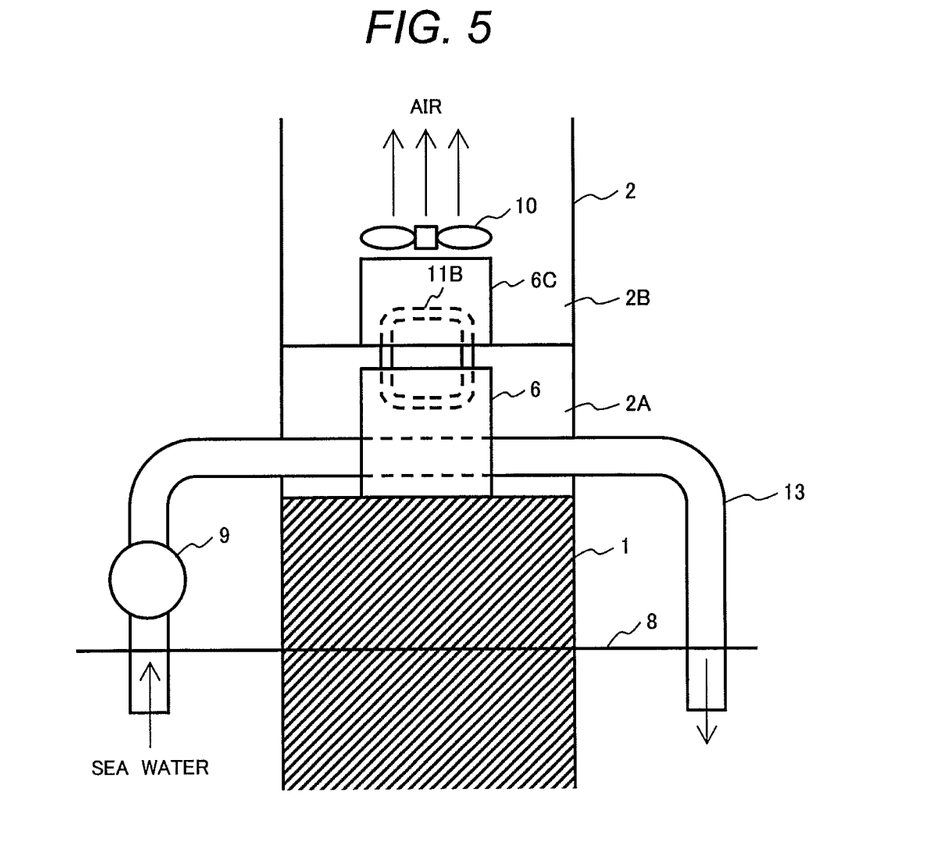
FIG. 5 is showing the embodiment 4 of the present invention and a partial cross sectional view near the bottom of the tower corresponding to FIG. 2

In FIG. 5, the embodiment 4 of the wind turbine generator system of the present invention is shown. About the same structure as in embodiment 1, the same reference signs are used, so that an explanation of them will be omitted.

The embodiment 4 shown in FIG. 5 is the alternative of the embodiment 1. The embodiment 4 shown in the figure has the same structure as in the embodiment 1 and differs from the embodiment 1 that above the heat exchanger 6 provided at the bottom part inside the tower, another heat exchanger 6C is provided in a tower inside 2B isolated from a tower inside 2A containing the heat exchanger 6. Further, the embodiment 3 differs from the embodiment 2 that a cooling medium circulation line 11B in which cooling medium (for instance, fresh water) is circulated is provided between the two heat exchangers 6 and 6C provided at the bottom part inside the tower, and the cooling medium is circulated in both the heat exchanger 6 and the heat exchanger 6C through a pipe arrangement.

In the embodiment 4 configured like this, the sea water 8 and cooling medium in the cooling medium circulation line 11B exchanges the heat in the heat exchanger 6, and the cooling medium is cooled. This cooling medium is introduced to the heat exchanger 6C by way of the cooling medium circulation line 11B, and exchanges the heat in the heat exchanger 6C with the air in the tower 2. Therefore, the same effect as in embodiment 1 can be obtained. Besides, if the sea water 8 is leaked from the heat exchanger 6 by any chance, a room in which the heat exchanger 6 is provided, is isolated from the other space, therefore, there is no risk to spread the salt content all over the tower 2.

Incidentally, in this embodiment, the heat exchanger 6 is provided in the isolated tower inside 2A, but the isolated room in which the heat exchanger 6 is provided may also be provided outside the tower.

Embodiment 5

Figure 6:
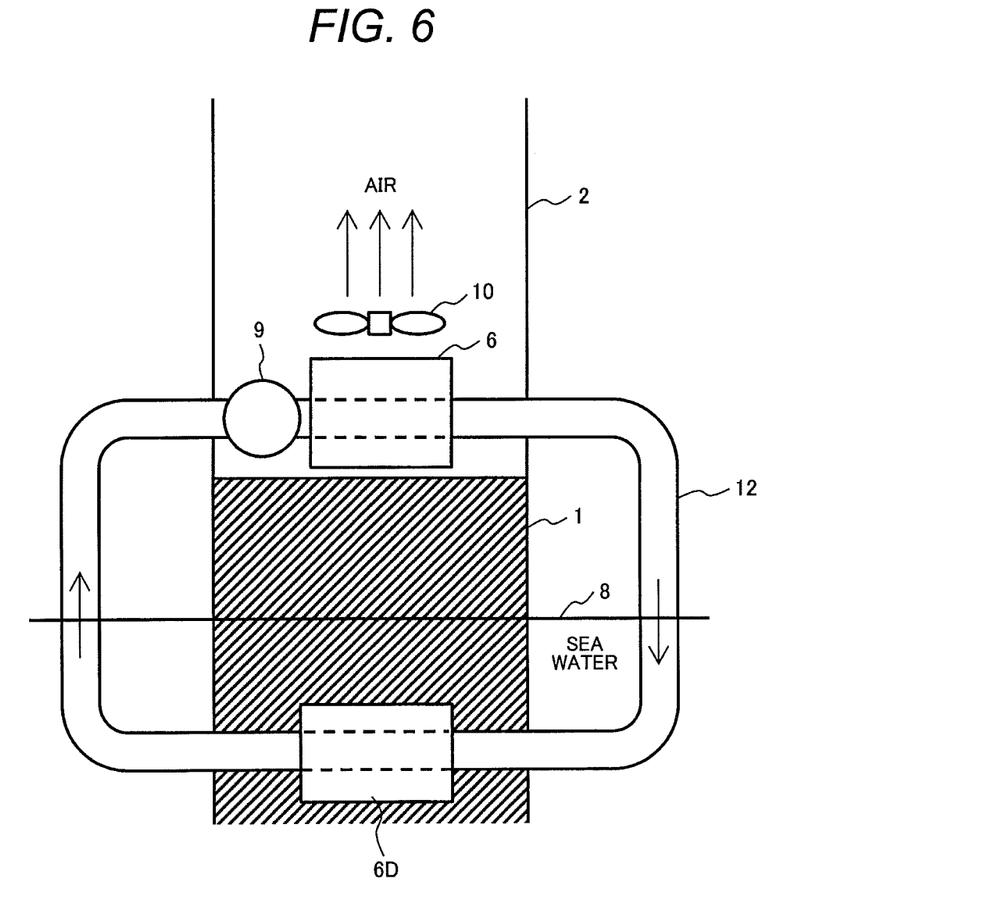
FIG. 6 is showing the embodiment 5 of the present invention and a partial cross sectional view near the bottom of the tower corresponding to FIG. 2

In FIG. 6, the embodiment 5 of the wind turbine generator system of the present invention is shown. About the same structure as in embodiment 1, the same reference signs are used, so that an explanation of them will be omitted.

In the embodiment 5, shown in FIG. 6, a heat exchanger 6 is provided at a bottom part inside the tower 2 which is fixed to a part of the base 1 fixed to the sea-bottom, and the part is protuberated from sea water 8. Further, also at the base 1 in the sea water 8, a heat exchanger 6D is provided. In addition, between these two heat exchangers 6 and 6D, a first cooling medium circulation line 12 in which cooling medium (for instance, freshwater) is circulated in both the heat exchanger 6 and the heat exchanger 6D through a pipe arrangement is provided.

The cooling medium cooled by exchanging the heat with the sea water 8 in the heat exchanger 6D provided in the sea water 8, is introduced to the heat exchanger 6 in the tower 2 through the first cooling medium circulation line 12, and the heat of the cooling medium and the heat of the air inside the tower 2 are exchanged in this tower 2. Accordingly, the air inside the tower 2 is cooled. Incidentally, the cooling medium in the first cooling medium circulation line 12 is circulated in the first cooling medium circulation line 12 using the pump 9 provided in a middle of the circulation line 12.

In the embodiment 5, not only the same effect as in embodiment 1 can be obtained, but also, since the sea water 8 does not enter the tower 2, the possibility of the corrosion of the equipment contained in the tower 2 is completely avoided.

Embodiment 6

Figure 7:
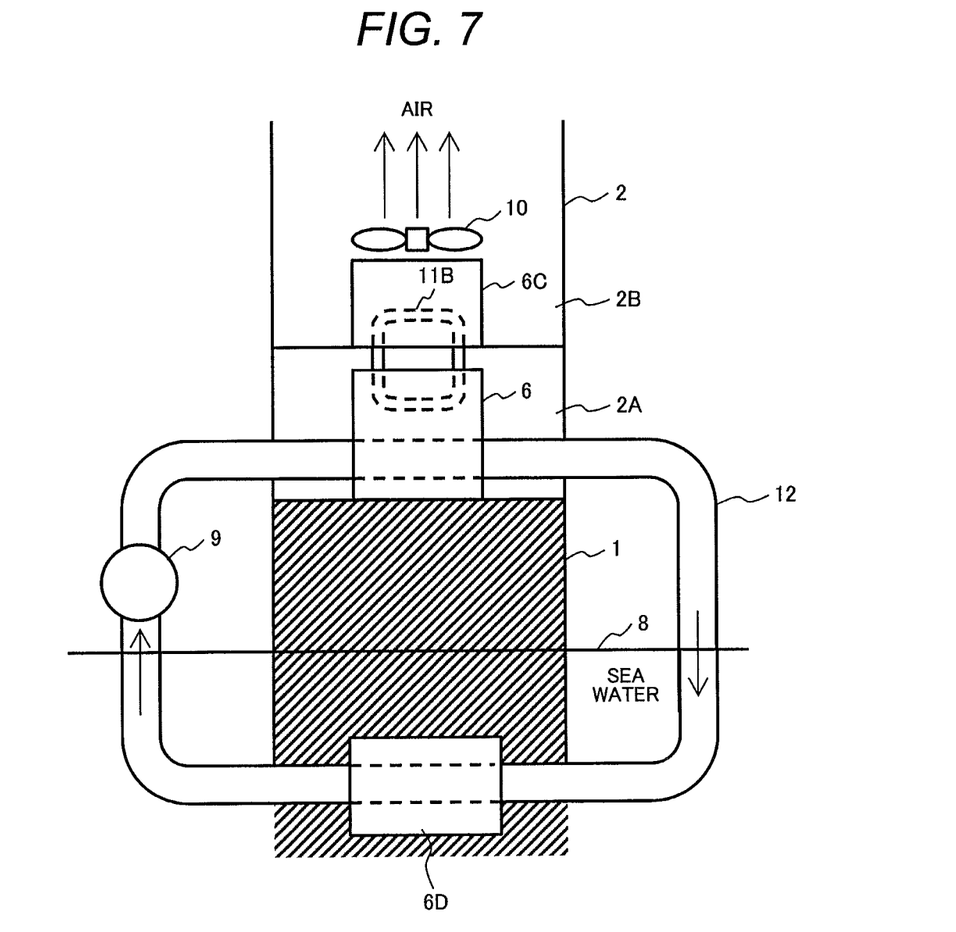
FIG. 7 is showing the embodiment 6 of the present invention and a partial cross sectional view near the bottom of the tower corresponding to FIG. 2

In FIG. 7, the embodiment 6 of the wind turbine generator system of the present invention is shown. About the same structure as in embodiment 5, the same reference signs are used, so that an explanation of them will be omitted.

The embodiment 6 shown in FIG. 7 is the alternative of the embodiment 5. The embodiment 6 shown in the figure has the same structure as in the embodiment 5 and differs from the embodiment 5 that above the heat exchanger 6 provided at the bottom part inside the tower, another heat exchanger 6C is provided in a tower inside 2B isolated from a tower inside 2A containing the heat exchanger 6. Further, the embodiment 6 differs from the embodiment 5 that a second cooling medium circulation line 11B in which cooling medium (for instance, fresh water) is circulated, is provided between the two heat exchangers 6 and 6C at the bottom part inside the tower, and the cooling medium is circulated in both the heat exchanger 6 and the heat exchanger 6C through a pipe arrangement.

In the embodiment 6, the cooling medium cooled by exchanging the heat with the sea water 8 in the heat exchanger 6D provided in the sea water is introduced to the heat exchanger 6 in the tower 2 through the first cooling medium circulation line 12. The heat of the cooling medium in the first cooling medium circulation line 12 and the heat of the cooling medium in the second cooling medium circulation line 11B are exchanged in the heat exchanger 6, and the cooling medium is cooled. This cooling medium is introduced to the heat exchanger 6C by way of the second cooling medium circulation line 11B, and the air inside the tower 2 is cooled. Therefore, the same effect as in embodiment 5 can be obtained. Besides, even if the sea water 8 is leaked from the heat exchanger 6 by any chance, a room in which the heat exchanger 6 is provided, is isolated from the other space, therefore, there is no risk to spread the salt content all over the tower 2.

Incidentally, in each embodiment described above, it is explained that the wind turbine generator system is provided off-shore and sea water is used as a cooling medium, but also even if lake water, river water and so on are used as the cooling medium, the same effect can be obtained.

EXPLANATION OF SIGNS

1: base, 2: tower, 2A, 2B: tower inside, 3: rotor, 3A: hub, 3B: blade, 4: generator, 5: nacelle, 6, 6A, 6C, 6D: heat exchanger, 7: duct, 8: sea water, 10: fan, 11A, 11B: cooling medium circulation line, 12: first cooling medium circulation line, 13, 14: pipe arrangement, 15: equipment

The invention claimed is:

1. A wind turbine generator system comprising:
a rotor having a hub and blades;
a generator connected with the rotor by way of a main shaft connected with the hub;
a nacelle which contains at least the generator and supports the rotor pivotally by way of the main shaft; and
a tower on a top of which the nacelle is supported, and opposite to the top the tower is fixed to a base;
wherein a heat exchanger is provided at the tower close to the base;
wherein cooling medium passes through the heat exchanger by way of a pipe arrangement, and thereby the heat of the cooling medium and the heat of air inside the tower are exchanged and the air inside the tower is cooled; and wherein a duct which introduces cooled air inside the tower to the nacelle is provided in the tower.

2. A wind turbine generator system according to claim 1, wherein the wind turbine generator system is provided off-shore, and the cooling medium is sea water.

3. A wind turbine generator system according to claim 2, wherein a pump to pump up the sea water from the sea is provided in a middle of the pipe arrangement, and the sea water pumped up by the pump is discharged into the sea after passing through the heat exchanger by way of the pipe arrangement.

4. A wind turbine generator system according to claim 3, wherein the heat exchanger is provided at a bottom part inside the tower.

5. A wind turbine generator system according to claim 3, wherein the heat exchanger is provided on a side wall outside and at a bottom part of the tower.

6. A wind turbine generator system according to claim 1, wherein the cooled air inside the tower is introduced to the duct using a fan set close to the heat exchanger.

7. A wind turbine generator system comprising:
a rotor having a hub and blades;
a generator connected with the rotor by way of a main shaft connected with the hub;
a nacelle which contains at least the generator and supports the rotor pivotally by way of the main shaft; and
a tower on a top of which the nacelle is supported, and opposite to the top the tower is fixed to a base;
wherein a heat exchanger is provided at the tower close to the base;
wherein cooling medium passes through the heat exchanger by way of a pipe arrangement, and thereby the heat of the cooling medium and the heat of air inside the tower are exchanged and the air inside the tower is cooled;
wherein the wind turbine generator system is provided off-shore, and the cooling medium is sea water;
wherein a pump to pump up the sea water from the sea is provided in a middle of the pipe arrangement, and the sea water pumped up by the pump is discharged into the sea after passing through the heat exchanger by way of the pipe arrangement;
wherein the heat exchanger is provided on a side wall outside and at a bottom part of the tower;
wherein a heat exchanger is provided at a bottom part inside the tower; and
wherein between the heat exchanger provided at the bottom part inside the tower and the heat exchanger provided on the side wall outside and at the bottom part of the tower, a cooling medium circulation line in which cooling medium is circulated is provided, and the cooling medium is circulated in both the heat exchanger provided at the bottom part inside the tower and the heat exchanger provided on the side wall outside and at the bottom part of the tower through a pipe arrangement.

8. A wind turbine generator system comprising:
a rotor having a hub and blades;
a generator connected with the rotor by way of a main shaft connected with the hub;
a nacelle which contains at least the generator and supports the rotor pivotally by way of the main shaft; and
a tower on a top of which the nacelle is supported, and opposite to the top the tower is fixed to a base;
wherein a heat exchanger is provided at the tower close to the base;
wherein cooling medium passes through the heat exchanger by way of a pipe arrangement, and thereby the heat of the cooling medium and the heat of air inside the tower are exchanged and the air inside the tower is cooled;
wherein the wind turbine generator system is provided off-shore, and the cooling medium is sea water;
wherein a pump to pump up the sea water from the sea is provided in a middle of the pipe arrangement, and the sea water pumped up by the pump is discharged into the sea after passing through the heat exchanger by way of the pipe arrangement;
wherein the heat exchanger is provided at a bottom part inside the tower;
wherein above the heat exchanger provided at the bottom part inside the tower, another heat exchanger is provided in the tower inside isolated from a tower inside containing the heat exchanger provided at the bottom part inside the tower; and
wherein a cooling medium circulation line in which cooling medium is circulated is provided between the two heat exchangers provided with isolation in the tower, and the cooling medium is circulated in both the heat exchangers through a pipe arrangement.

9. A wind turbine generator system comprising:
a rotor having a hub and blades;
a generator connected with the rotor by way of a main shaft connected with the hub;
a nacelle which contains at least the generator and supports the rotor pivotally by way of the main shaft; and
a tower on a top of which the nacelle is supported, and opposite to the top the tower is fixed to a base;
wherein the wind turbine generator system is provided off-shore,
wherein heat exchangers are provided at the tower close to the base and in the sea, respectively,
wherein between the two heat exchangers, a first cooling medium circulation line in which cooling medium is circulated is provided, and the cooling medium is circulated in both of the heat exchangers through a pipe arrangement,
wherein the cooling medium is cooled by exchanging the heat with sea water, in the heat exchanger provided in the sea passing through the first cooling medium circulation line, and the cooling medium is introduced into the heat exchanger provided inside the tower, and
wherein the heat of the cooling medium and the heat of the air inside the tower are exchanged in the heat exchanger provided inside the tower, and the air inside the tower is cooled.

10. A wind turbine generator system according to claim 9, wherein a pump which circulates the cooling medium is provided in a middle of the first cooling medium circulation line.

11. A wind turbine generator system according to claim 10,
wherein above the heat exchanger provided at the bottom part inside the tower, another heat exchanger is provided in a tower inside isolated from a tower inside containing the heat exchanger provided at the bottom part inside the tower, and
wherein a second cooling medium circulation line in which cooling medium is circulated is provided between the two heat exchangers provided with isolation in the tower, and the cooling medium is circulated in both the heat exchangers through a pipe arrangement.

12. A wind turbine generator system according to claim 11, wherein a duct which introduces cooled air inside the tower to the nacelle is provided in the tower.

13. A wind turbine generator system according to claim 10, wherein a duct which introduces cooled air inside the tower to the nacelle is provided in the tower.

14. A wind turbine generator system according to claim 9,
wherein above the heat exchanger provided at the bottom part inside the tower, another heat exchanger is provided in a tower inside isolated from a tower inside containing the heat exchanger provided at the bottom part inside the tower, and
wherein a second cooling medium circulation line in which cooling medium is circulated is provided between the two heat exchangers provided with isolation in the tower, and the cooling medium is circulated in both the heat exchangers through a pipe arrangement.

15. A wind turbine generator system according to claim 14, wherein a duct which introduces cooled air inside the tower to the nacelle is provided in the tower.

16. A wind turbine generator system according to claim 9, wherein a duct which introduces cooled air inside the tower to the nacelle is provided in the tower.

17. A wind turbine generator system according to claim 16, wherein the cooled air inside the tower is introduced to the duct using a fan set close to the heat exchanger.

* * * * *